Nov. 26, 1929. G. ALTIMARI ET AL Re. 17,506

FLUE SANDER

Original Filed May 4, 1926 2 Sheets-Sheet 1

G. ALTIMARI
J. A. CAMPBELL INVENTORS.

BY
Merrill M. Blackburn
ATTORNEY.

Nov. 26, 1929. G. ALTIMARI ET AL Re. 17,506

FLUE SANDER

Original Filed May 4, 1926 2 Sheets-Sheet 2

G. ALTIMARI
J. A. CAMPBELL INVENTORS.

BY Merrill M. Blackburn
ATTORNEY.

Reissued Nov. 26, 1929

Re. 17,506

UNITED STATES PATENT OFFICE

GEORGE ALTIMARI AND JOHN ALONZO CAMPBELL, OF PARSONS, KANSAS, ASSIGNORS TO E. H. BAKER AND M. H. BAKER, OF DAVENPORT, IOWA

FLUE SANDER

Original No. 1,618,638, dated January 11, 1927, Serial No. 106,769, filed May 4, 1926. Application for reissue filed January 10, 1929. Serial No. 331,623.

The present invention is concerned with the provision of a sander for removing the carbon deposits or soot from the fire side of the tubes, flues and fire sheet of steam locomotives.

An object of the invention is to provide a device of this character which will clean the entire surface of the flue sheet, and all of the tubes, as opposed to the ordinary inefficient types of sanders which effect thorough cleaning of only a portion of the flue sheet and the central tubes.

A further object of the invention is to provide a sander in which considerable economy of fuel oil is effected by virtue of the more efficient cleaning action.

A further object of the invention is to provide a sander which will effect a material economy of sand, due to the uniformity of sand feed and the uniformity of the spray which strikes all parts of the flue plate.

A further object of the invention is to provide a sander which the operator may manually regulate from his seat in the engine cab, so that the common inconvenience of dipping sand from a box, carrying it to the fire box, and pouring it into a horn is eliminated.

Another object of the invention is to provide a sander which will do away with the usual inconvenience of sand settling into the cracks of the brick floor of the fire pan, and the consequent lifting and working out of place of the bricks as the sand works down under them. In other words, the use of the sander will entail no extra labor in keeping the fire pan floor in good condition, or for cleaning the wasted sand out of the fire box of the locomotive front end.

A further object of the invention is to so house the sand supply, that no sand can possibly spill into the cab, or be blown into the cab. Thus, there is no danger of sand blowing into the eyes of the crew or becoming scattered over the cab and machinery.

Still another object of the invention is to provide a sander which may be operated while the locomotive is idling, or may be operated by simply turning on the blower to create a draft through the fire box and tubes, as opposed to the conventional practice which permits of a sanding operation only when the locomotive is running at full speed.

Other objects of the invention are to provide a sander of simple, practical construction, which will be rugged, and durable in use, easy to manipulate, capable of installation in any ordinary locomotive, and lending itself to economy of manufacture.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Figure 1:
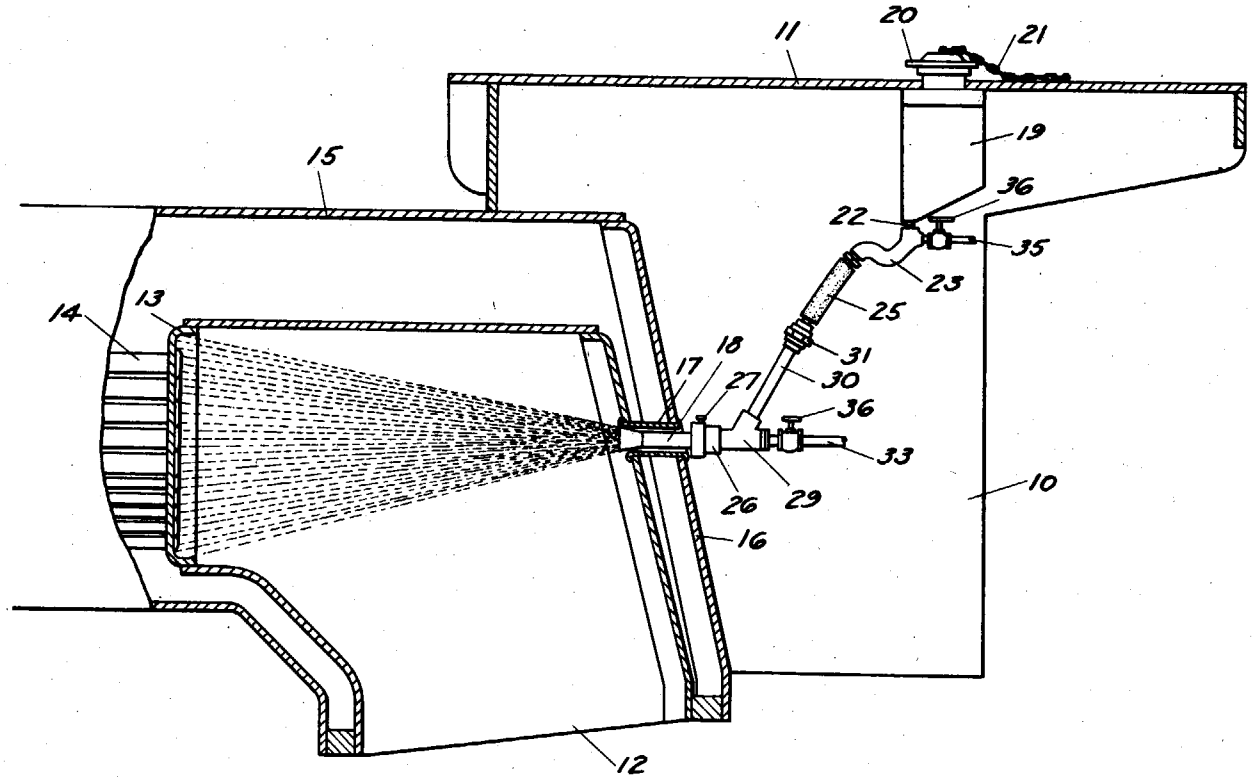
Fig. 1 is a fragmentary, somewhat diagrammatic sectional view through the rear end of a locomotive boiler, fire box and cab, showing a sander embodying the present invention in operative position.
Figure 2:
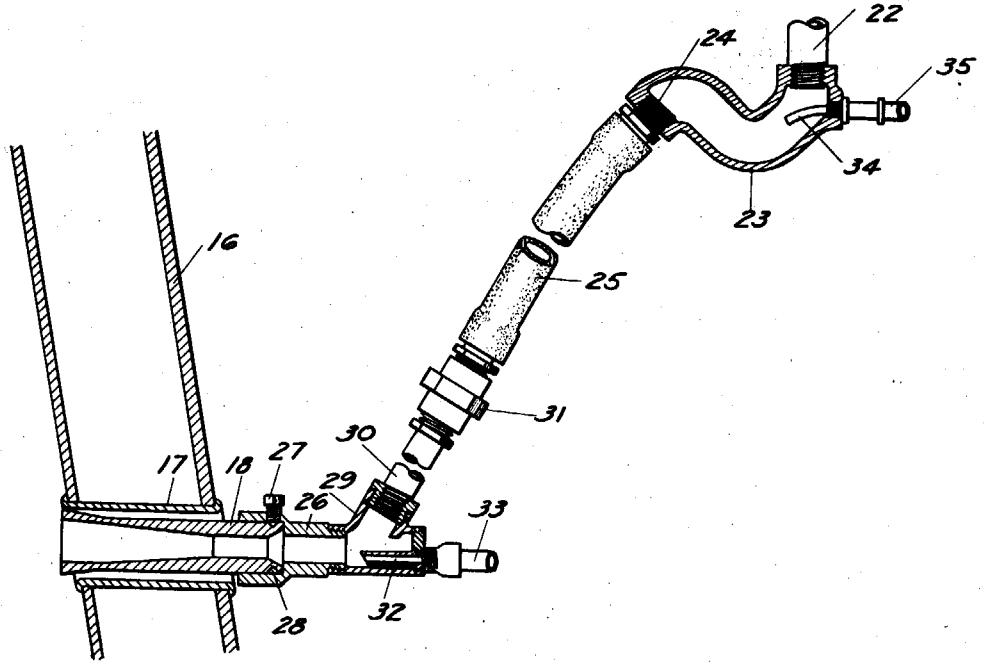
Fig. 2 is an enlarged fragmentary broken view, partly in section and partly in elevation illustrating the details of the sander nozzle and sand trap.

In the drawings we have used the reference character 10 to designate the cab of a locomotive provided with the usual roof 11. The fire box is designated at 12, the flue sheet at the front end of the fire box bears the reference character 13, and the flues are indicated at 14. The boiler 15 is provided with the usual back head 16 which constitutes the rear wall of the fire box 12. In the back head 16 of the boiler there is provided a sleeve 17 adapted for the reception of a sand spraying nozzle 18 through which the sand is introduced into the fire box.

As thus far described the construction may be entirely conventional, and the usual practice is to simply pour sand through the opening 17 and rely on the draft through the fire box and flues to effect cleaning of the flue sheet and flues by the action of the sand. Such a practice is obviously inefficient and possesses many disadvantages, as noted in the objects of the invention.

In accordance with the present invention, we blow sand through the nozzle 18 under pressure, spraying it in a fine spray over the entire surface of the flue sheet 13, and causing it to enter all of the tubes 14, so that the face of the flue sheet, as well as the tubes are thoroughly scoured and cleaned by the sand, and all soot or carbon deposits removed therefrom. As noted above this action may be carried out simply by the force of the sand spray aided by a blower creating a draft through the fire box and flues, and regardless of whether or not the locomotive is running at full speed.

A sand hopper 19 is secured to the roof of the cab, and is provided with a removable cover cap 20 at the exterior of the cab. Thus, the hopper is filled from the outside of the cab and there is no danger of sand being spilled over the machinery, or over the floor of the cab. A chain 21 may be associated with the cover 20 to prevent its accidental loss while filling the hopper.

A depending discharge pipe 22 at the bottom of the hopper communicates with a casting 23 which constitutes a sand trap, and prevents gravitational flow of sand from the hopper to the fire box. Pipe 22 is preferably screwed into one end of the trap 23, and the outlet end of the trap carries a threaded nipple 24 receiving a flexible hose connection 25. The nozzle 18 is mounted in a chuck 26 fitting over the rear end of the nozzle and secured thereto by a set screw 27 working in an annular groove 28 in the nozzle. Screwed on to the rear end of the chuck 26 is a Y-coupling 29 receiving a pipe 30 which is connected to the lower end of the hose line 25 in any appropriate manner, as by the use of a coupling 31.

The nozzle 32 of an air line 33 enters the casting 29 and is adapted to discharge air directly through the nozzle 18. The nozzle 34 of an air line 35 is disposed in the sand trap 23.

In operation, no sand will flow from the hopper to the nozzle 18 under the influence of gravity. The control valves 36 for the air lines 33 and 35 are within convenient reach of the operator. Air entering the sand trap through the nozzle 34 will be directed through the sand line 25 to the nozzle 18 carrying with it some of the sand from the trap 23, and causing the trap to gravitationally refill from the hopper. Thus, the sand is carried along with the air stream to the casting 29 where a strong air jet blowing through nozzle 32 carries it at high speed and under considerable pressure through the nozzle 18 and into the fire box.

The sand is thus sprayed over the face of the flue plate 13 carried through the flues 14 and out of the stack. The normal, or forced draft through the fire box and flues will of course aid the air jet from the nozzle 32 in carrying the sand along through the flues, and in preventing sand from the nozzle 18 from dropping into the fire box.

While we have illustrated one of the preferred embodiments of the invention, various changes and alterations might be made in the general form and arrangement of parts described without departing from the invention. Hence we do not wish to limit ourselves to the details set forth, but shall consider ourselves at liberty to make such changes and alterations as fairly fall within the spirit and scope of the appended claims.

We claim:

1. The combination with a locomotive including a cab, a tube type boiler and a fire box, of a sander nozzle mounted in the back head of the boiler and adapted to discharge sand over the face of the flue plate, a sand hopper mounted in the roof of the cab and having a filling opening arranged above the roof, a sand line connecting the hopper and the nozzle, and an air line discharging through the nozzle.

2. The combination with a locomotive having a tube type boiler provided with a flue plate, of a sander nozzle mounted in the back head of the boiler and arranged to discharge sand over the face of the flue plate, a sand hopper mounted on the locomotive at a higher elevation than the nozzle and remote therefrom, a sand line connecting the hopper and the nozzle, an air line discharging through the nozzle, and means for preventing unrestricted flow of sand from the hopper to the nozzle, said means including a sand trap in the sand line between the hopper and the nozzle, and means for forcing the sand out of the trap into said sand line.

3. The combination with a locomotive having a tube type boiler provided with a flue plate, of a sander nozzle mounted in the back head of the boiler and arranged to discharge sand over the face of the flue plate, a sand hopper mounted on the locomotive at a higher elevation than the nozzle and remote therefrom, a sand line connecting the hopper and the nozzle, an air line discharging through the nozzle, means for preventing unrestricted flow of sand from the hopper to the nozzle, said means including a sand trap in the sand line, and an air nozzle for blowing sand out of the trap into the sand line.

4. The combination with a locomotive including a cab, a tube type boiler and a fire box, of a sander nozzle mounted in the back head of the boiler and adapted to discharge sand over the face of the flue plate, a sand hopper mounted in the cab and a sand line connecting the hopper and the nozzle, an air line discharging through the nozzle, and means for preventing gravitational flow of sand from the hopper to the nozzle, said hopper being secured to the roof of the cab and having a filling opening disposed exteriorly of the cab.

5. The combination with a boiler having flues and a flue plate, of a sand blast apparatus comprising a nozzle arranged to discharge sand against said plate and through said flues, a sand hopper arranged in fixed position at a higher elevation than and remote from said nozzle, a sand line connecting the hopper and nozzle, an air line discharging through the nozzle, means for preventing unrestricted flow of sand from the hopper to the nozzle through said line, said means including a sand trap in said sand line between the hopper and the nozzle and means for forcing sand out of the trap into the sand line.

In witness whereof, we hereunto subscribe our names to this specification.

GEORGE ALTIMARI.
JOHN ALONZO CAMPBELL.